US008035957B2

(12) United States Patent
Jung

(10) Patent No.: US 8,035,957 B2
(45) Date of Patent: Oct. 11, 2011

(54) MONITOR APPARATUS HAVING LINKS TO MOVE A MONITOR MAIN BODY WITH RESPECT TO A BASE

(75) Inventor: Jun-su Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 279 days.

(21) Appl. No.: 11/354,946

(22) Filed: Feb. 16, 2006

(65) Prior Publication Data

US 2006/0201098 A1    Sep. 14, 2006

(30) Foreign Application Priority Data

Mar. 8, 2005    (KR) .................. 10-2005-0018977

(51) Int. Cl.
*G06F 1/16*  (2006.01)
(52) U.S. Cl. .............. 361/679.07; 361/679.06; 248/917; 248/919; 248/922; 248/923
(58) Field of Classification Search .............. 361/681, 361/683, 679.01–679.45, 679.55–679.59; 248/917–924; 312/223.1, 223.2
See application file for complete search history.

(56) References Cited

U.S. PATENT DOCUMENTS

| 4,834,329 | A  | * | 5/1989 | Delapp ................. 248/183.3 |
| 6,370,020 | B1 | * | 4/2002 | Toukairin ................ 361/681 |
| D521,996  | S  | * | 5/2006 | Kim et al. .............. D14/375 |
| 7,289,315 | B2 | * | 10/2007 | Hillman et al. ............ 361/683 |
| 7,567,436 | B2 | * | 7/2009 | Jeong ................. 361/679.22 |
| 2002/0053629 | A1 | * | 5/2002 | Hokugoh .................. 248/371 |
| 2004/0012917 | A1 | * | 1/2004 | Jung et al. ................ 361/681 |
| 2004/0084579 | A1 | * | 5/2004 | Lee et al. ................ 248/125.1 |
| 2004/0212956 | A1 |   | 10/2004 | Kuivas et al. |
| 2005/0002159 | A1 |   | 1/2005  | Jeong |

FOREIGN PATENT DOCUMENTS

| CN | 1497610       | 5/2004 |
| EP | 1 344 972 A2  | 9/2003 |
| JP | 2003-223238   | 8/2003 |
| KR | 2000-15675    | 8/2000 |
| KR | 20-326987     | 9/2003 |
| KR | 10-2004-0028113 | 4/2004 |
| KR | 2004-96097    | 11/2004 |
| KR | 10-482007     | 3/2005 |

OTHER PUBLICATIONS

International Search Report.

(Continued)

*Primary Examiner* — Jayprakash N Gandhi
*Assistant Examiner* — Nidhi Desai
(74) *Attorney, Agent, or Firm* — Stanzione & Kim, LLP

(57) ABSTRACT

A monitor apparatus includes a monitor main body displayed with an image, a base to support the monitor main body, a lower link having an end coupled to a base hinge to tilt with respect to the base, an upper link having an end coupled to a monitor hinge to tilt with respect to the monitor main body, and a middle link having a first side tiltably coupled to a first middle hinge with respect to the lower link and a second side tiltably coupled to a second middle hinge with respect to the upper link to control the upper link and the lower link to be folded in parallel. The monitor apparatus provides a various angle change of the monitor main body, and a packing volume of the monitor apparatus is reduced.

28 Claims, 12 Drawing Sheets

OTHER PUBLICATIONS

Korean Office Action dated Jun. 8, 2006 of Korean Patent Application No. 10-2005-0018977.

Chinese Search Report issued on Oct. 10, 2008 in CN 200610056792X.

* cited by examiner

MONITOR APPARATUS HAVING LINKS TO MOVE A MONITOR MAIN BODY WITH RESPECT TO A BASE

CROSS-REFERENCE TO RELATED APPLICATIONS

This application claims the benefit of Korean Patent Application No. 2005-0018977, filed on Mar. 8, 2005, in the Korean Intellectual Property Office, which is hereby incorporated by reference for all purposes as if fully set forth herein.

BACKGROUND OF THE INVENTION

1. Field of the Invention

The present general inventive concept relates to a monitor apparatus, and more particularly, to a monitor apparatus having a rotating structure to move a monitor main body with respect to a base.

2. Description of the Related Art

Generally, conventional monitor apparatuses have a monitor main body displayed with an image, and a base to support the monitor main body, and a link to rotate the monitor main body in a front and rear direction or adjust a height of the monitor main body with respect to a base.

Such a conventional monitor apparatus is disclosed in Korean Patent Application No. 2002-59208. The conventional monitor apparatus comprises a lower link rotatably connected to a base hinge provided in a base, an upper link rotatably connected to a monitor hinge provided at a monitor main body; a link hinge provided between the upper link and the lower link and to rotate the upper link with respect to the lower link at a predetermined angle, and a first auxiliary link to transmit a rotating force of the lower link with respect to the base to rotate the upper link. Therefore, the conventional monitor apparatus is capable of tilting the monitor main body about a horizontal axis in the front and rear direction and adjusting a height of the monitor main body while being tilted.

However, the monitor main body needs a various angle change to meet various requirements of a user. Further, there is needed an improved structure to minimize a packing volume of the conventional monitor apparatus.

SUMMARY OF THE INVENTION

The present general inventive concept provides for a monitor apparatus having a various angle change of a monitor main body and minimizing a packing volume.

Further, the present general inventive concept provides a monitor apparatus capable of maintaining a viewing angle of monitor main body while adjusting a height of the monitor main body with respect to a base.

Additional aspects and advantages of the present general inventive concept will be set forth in part in the description which follows and, in part, will be obvious from the description, or may be learned by practice of the general inventive concept.

The foregoing and/or other aspect of the present general inventive concept may be achieved by providing a monitor apparatus comprising a monitor main body, a base, a plurality of links provided between the monitor main body and the base, and a middle link disposed and respectively coupled between the links such that the monitor main body and the base are folded each other.

The monitor apparatus may further comprise a pivoting unit to pivot the monitor main body about a landscape and portrait direction with respect to the links.

The pivoting unit may comprise a pivoting bracket coupled to one of the links, and a monitor bracket having a first side thereof pivotably coupled to the pivoting bracket and a second side thereof coupled to the monitor main body.

The plurality of links may comprise a lower link having tiltably coupled to the base and an upper link tiltably coupled to the monitor main body, and the middle link is disposed between the lower link and the upper link.

The monitor apparatus may further comprise a base hinge coupled between the lower link and the base and a monitor hinge coupled between the upper link and the monitor main body.

The monitor hinge may comprises a monitor bracket coupled to the monitor main body and a monitor hinge shaft coupled to the monitor bracket and the upper link to rotate at least one of the monitor bracket and the upper link, and the base hinge may comprise a base bracket coupled to the base and a base hinge shaft coupled to the base bracket and the lower link to rotate at least one of the base bracket and the lower link.

The monitor apparatus may further comprise a cable to connect the monitor main body and the base. The base hinge shaft and the monitor hinge shaft may comprise a base shaft penetrating part and a monitor shaft penetrating part respectively which have a hollow shape to be penetrated by the cable. The middle link may comprise a second hinge shaft penetrating part depressed so that the cable, which passes through the monitor shaft penetrating part and is extended to a lateral portion of the upper link, is inserted in an axis direction of the monitor hinge shaft, and a first hinge shaft penetrating part depressed to connect the second hinge shaft penetrating part so that the cable passes from the second hinge shaft penetrating part in an axis direction of the base hinge shaft and is extended to a lateral portion of the lower link The middle link may comprise a first middle hinge coupled to a first side of the middle link to tiltably move with respect to the lower link, and a second middle hinge coupled to a second side of the middle link to tiltably move with respect to the upper link such that the upper link and the lower link are folded to be parallel to each other The monitor apparatus may further comprise a base hinge coupled between the lower link and the base and a monitor hinge coupled between the upper link and the monitor main body.

The first and second middle hinges may comprise a first hinge shaft and a second hinge shaft rotatably coupled to the lower link and the upper link, respectively.

The middle link may comprise a first shaft coupling part and a second shaft coupling part respectively coupled to the first hinge shaft and the second hinge shaft such that the first shaft and the second shaft do not rotate with respect to each other.

The monitor apparatus may further comprise a first auxiliary link to connect the first middle hinge and the base hinge to transmit a tilting force of the lower link with respect to the base to the middle link to tilt the middle link with respect to the lower link.

The monitor apparatus may further comprise a first spring member. The first auxiliary link may comprise a pair of first auxiliary links, and both sides of the first spring member are respectively coupled to corresponding portion of the pair of the first auxiliary links to press in the lower link in a tiling direction of one of forward and backward directions with respect to the base.

The monitor apparatus may further comprise a second auxiliary link to connect the second middle hinge and the monitor hinge to transmit a second tilting force of the upper link with respect to the middle link to the monitor main body to tilt the monitor main body with respect to the upper link.

The monitor apparatus may further comprise a second spring member. The second auxiliary link may comprise a pair of second auxiliary links, and both sides of the second spring member are respectively coupled to the pair of the second auxiliary links to press in the upper link in a second tilting direction of one of second forward and backward directions with respect to the lower link.

The monitor apparatus may further comprise a swivel member coupled with the base hinge, and a swivel supporter to support and fasten a middle area of the swivel member and the base to swivel the swivel member with respect to the base.

The foregoing and/or other aspect of the present general inventive concept may also be achieved by providing a monitor apparatus comprising a monitor main body, a base, a base hinge coupled to the base, a lower link having an end coupled to the base hinge to tilt with respect to the base, a monitor hinge coupled to the monitor main body, an upper link having an end coupled to the monitor hinge to tilt with respect to the monitor main body, a middle link disposed between the lower link and the upper link, a first middle hinge coupled to a first side of the middle link to tiltably move with respect to the lower link, and a second middle hinge coupled to a second side of the middle link to tiltably move with respect to the upper link such that an angle between a plane of the monitor main body and a plane of the base is maintained when the monitor main body rotates with respect to the upper link, the angle is maintained when the upper link rotates with respect to the lower link, and the angle is maintained when the lower link rotates with respect to the base.

The foregoing and/or other aspect of the present general inventive concept may also be achieved by providing a monitor apparatus comprising a monitor main body, a base, a base hinge coupled to the base, a lower link having an end coupled to the base hinge to tilt with respect to the base, a monitor hinge coupled to the monitor main body, an upper link having an end coupled to the monitor hinge to tilt with respect to the monitor main body, a middle link disposed between the lower link and the upper link, a first middle hinge coupled to a first side of the middle link; a second middle hinge coupled to a second side of the middle link, a first auxiliary link coupled between the base hinge and the first middle hinge, and a second auxiliary link coupled between the second middle hinge and the monitor hinge.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
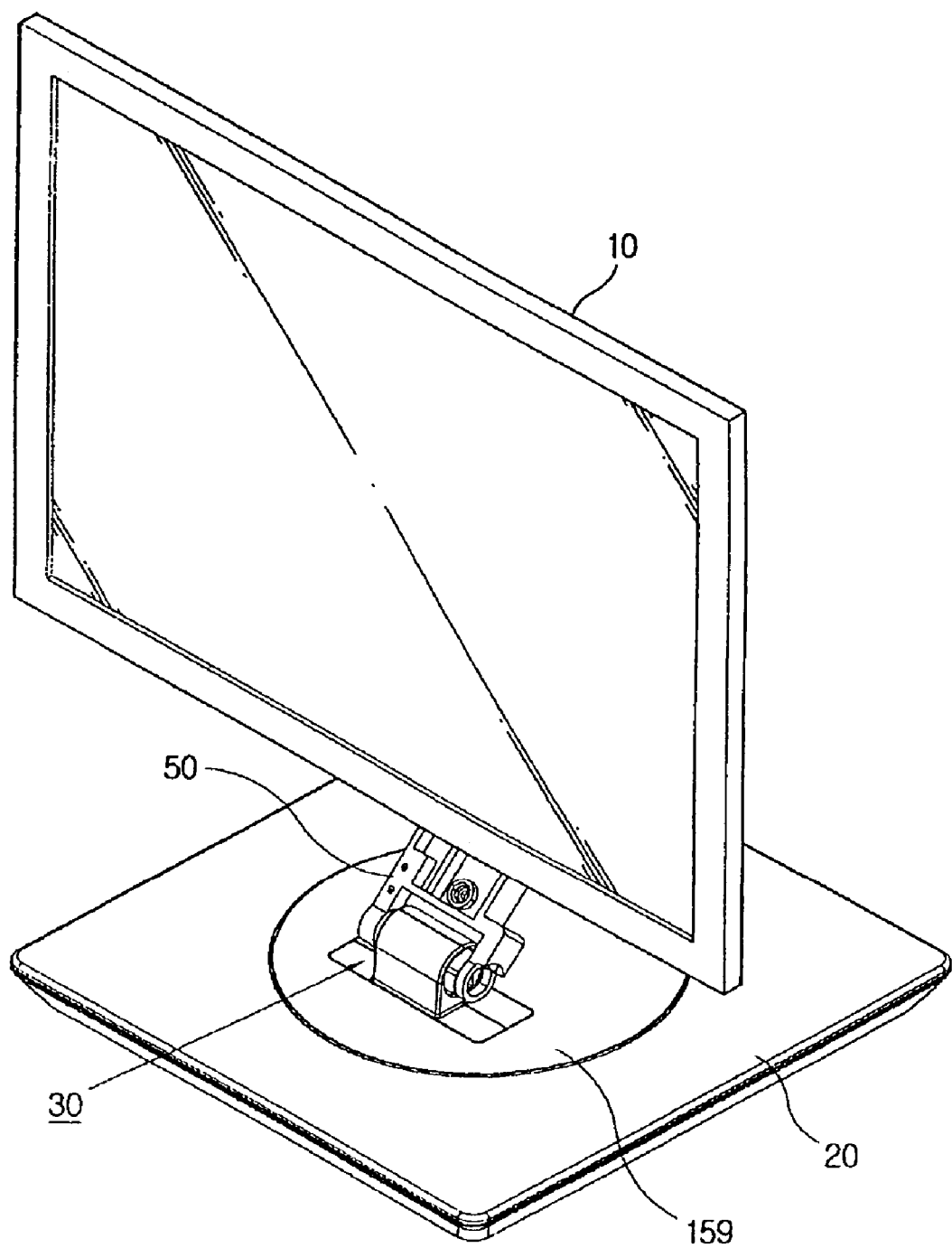
FIG. 1 is a perspective view illustrating a monitor apparatus according to an embodiment of the present general inventive concept.
Figure 2:
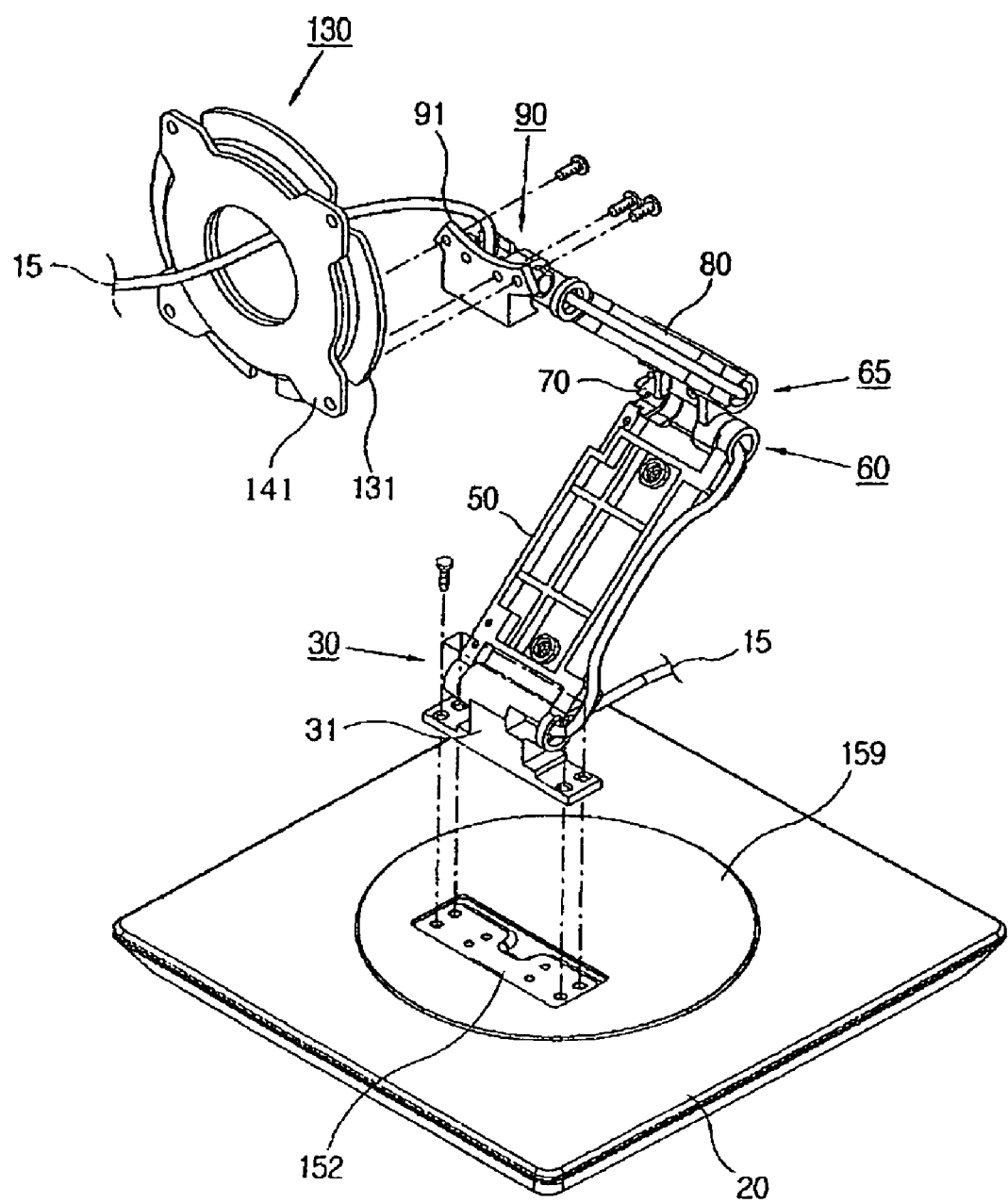
FIGS. 2 and 3 are an exploded perspective view illustrating the monitor apparatus of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Referring to FIGS. 1 through 6, a monitor apparatus according to an embodiment of the present general inventive concept includes a monitor main body 10 displayed with an image, a base 20 to support the monitor main body 10, a lower link 50 having an end thereof rotated with respect to the base 20, a base hinge 30 provided between the base 20 and the lower link 50 to rotate the lower link 50 with respect to the base 20, an upper link 80 having an end thereof rotated with respect to the monitor main body 10, a monitor hinge 90 provided between the monitor main body 10 and the upper link 80 to rotate the upper link 80 with respect to the monitor main body 10, a middle link 70 having a first side thereof rotated with the lower link 50, and a second side thereof rotated with the upper link 80, a first middle hinge 60 provided between the lower link 50 and the middle link 70 to rotate the middle link 70 with respect to the lower link 50, and a second middle hinge 65 provided between the upper link 80 and the middle link 70 to rotate the upper link 80 with respect to the middle link 70.

Figure 3:
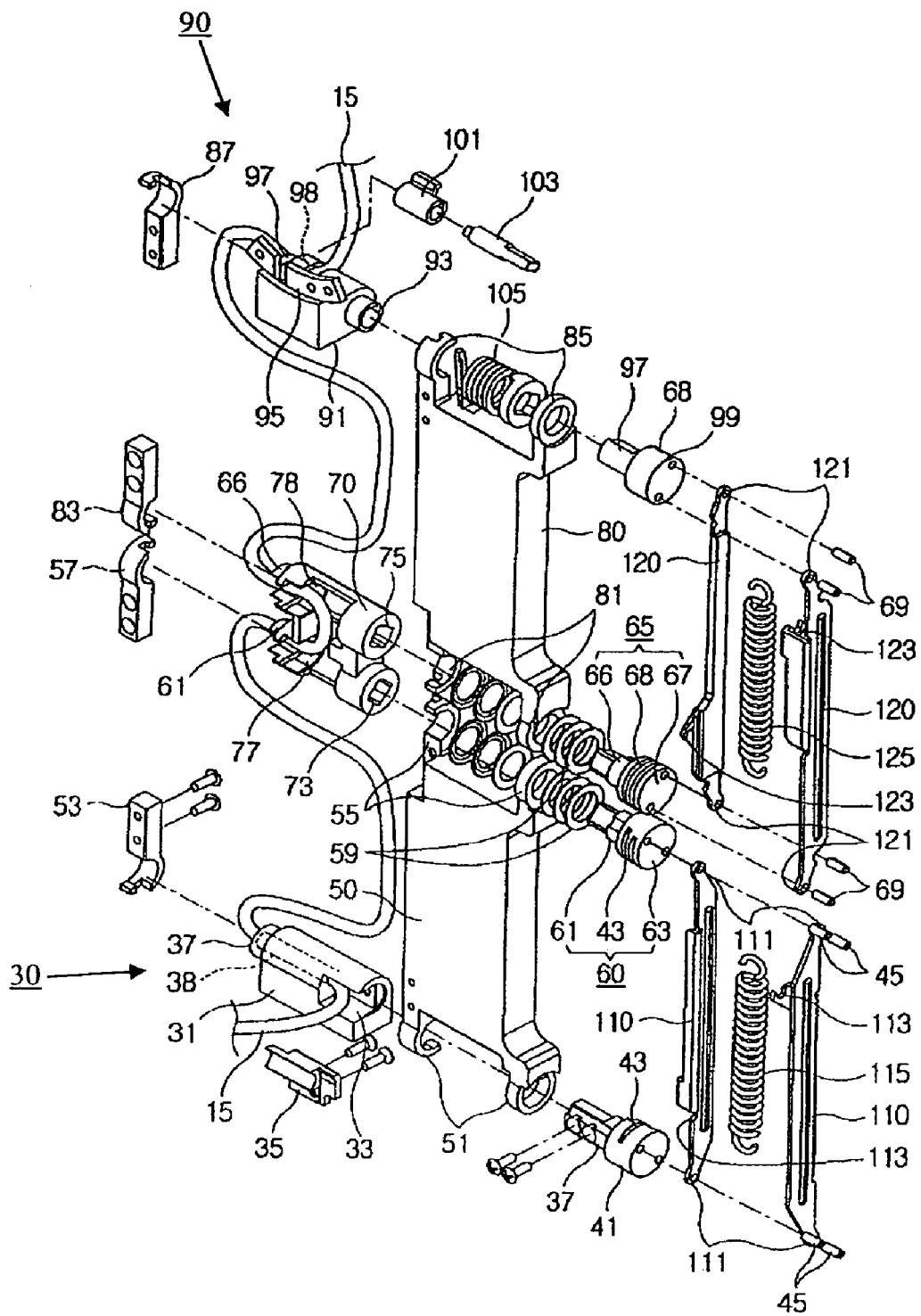

As illustrated in FIG. 3, the monitor apparatus according to the present embodiment further comprises first auxiliary links 110 to transmit rotating of the lower link 50 with respect to the base 20 to rotating of the middle link 70, and second auxiliary links 120 to transmit a rotating force of the upper link 80 with respect to the middle link 70 to the monitor main body 10 to rotate the monitor body 10 with respect to the upper link 80.

Figure 6:
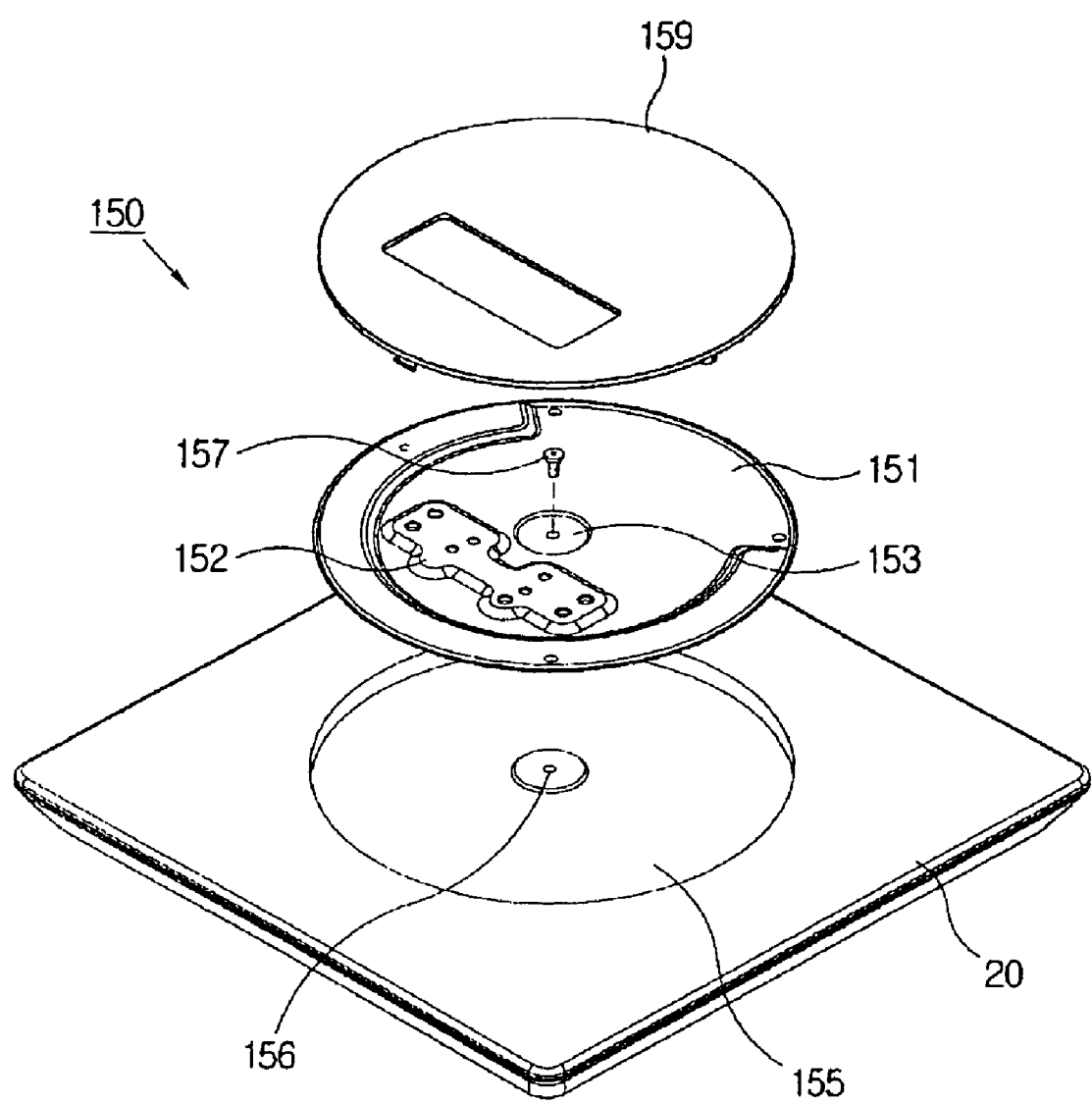
FIG. 6 is an exploded perspective view illustrating a swivel unit of the monitor apparatus of FIG. 1.

As illustrated in FIG. 6, the monitor apparatus according to the present embodiment comprises a swivel unit 150 to swivel the monitor main body 10 about a vertical direction axis with respect to the base 20. The monitor apparatus may further comprise a pivoting unit 130 to pivot the monitor main body 10 about a front and rear direction axis with respect to the upper link 80.

The monitor main body 10 may be used with a thin display panel, such as an LCD and a PDP, and the like since they can maintain a thickness while a size of a display part becomes larger. The monitor main body 10 is displayed with the image in a front area thereof, and is fastened to a main body bracket 141 (FIGS. 2 and 5) of the pivoting unit 130 (to be described later) by a screw to pivot the monitor main body 10 in a rear area thereof.

The base 20 is shaped like a plate to be stably seated on an installation surface such a table to support the monitor main body 10, and an upper side thereof is provided with the swivel unit 150 to swivel the monitor main body 10.

The base hinge 30 supports the lower link 50 against the base 20 to tilt the lower link 50 about a horizontal direction axis with respect to the base 20. The base hinge 30 comprises a base bracket 31 coupled to the base 20, and base hinge shafts 37 coupled to the base bracket 31 and the lower link 50 to rotate at least one of the base bracket 31 and the lower link 50. The base hinge 30 further comprises a base auxiliary link supporter 41 integrally coupled to the base bracket 31 to rotatably support the first auxiliary links 110. The base hinge 30 further comprises a base shaft fastener 33 to accommodate the base hinge shaft 37 provided at an end of the base auxiliary link supporter 41 and fastened by a screw, and a base shaft fastening cover 35 to cover the base shaft fastener 33.

As illustrated in FIG. 3, the base hinge shafts 37 are respectively provided in an end of the base bracket 31 and an end of the base auxiliary link supporter 41 to be rotatably coupled with both sides of the lower link 50. At least one of a pair of the base hinge shafts 37 is provided with a base shaft penetrating part 38 to be penetrated by a cable 15 which connects the monitor main body 10 and the base 20. According to the present embodiment, the base shaft penetrating part 38 is provided at the base hinge shaft 37 provided in the end of the base bracket 31. The cable 15 passing through the base shaft penetrating part 38 is extended to the base 20 through an inside of the base bracket 31.

The base auxiliary link supporter 41 is provided with a pair of first auxiliary coupling parts 43 to accommodate a lower side of first supporting fastening parts 111 provided in both sides of a pair of the first auxiliary links 110 to be rotatably coupled by first auxiliary link coupling pins 45.

The first auxiliary link coupling pins 45 are coupled with the first auxiliary coupling parts 43 to eccentrically place the first auxiliary links 110 with respect to the rotating axis of the base hinge shafts 37.

The lower link 50 may be an approximately rectangle plate and may include a lower side thereof tiltably coupled to the base hinge 30 and an upper side thereof tiltably coupled to the first middle hinge 60. The lower link 50 comprises base shaft supporters 51 provided in lower opposite sides of the lower link 50 and to accommodate and rotatably couple the base hinge shafts 37, and a pair of first hinge shaft supporters 55 provided in upper opposite sides of the lower link 50 to accommodate and rotatably couple a pair of first hinge shafts 61 of the first middle hinge 60.

At least one of the pair of the base shaft supporters 51 includes a cutout portion formed on an end thereof to easily accommodate the base hinge shaft 37, and another base shaft supporter 53 is coupled to the lower link 50 by screws to cover the cutout portion after the base hinge shaft 37 is disposed in the base shaft supporters 51.

At least one of the pair of the first hinge shaft supporters 55 includes a cutout portion formed on an end thereof to easily accommodate the first hinge shaft 61, and another first hinge shaft supporter 57 is coupled to the lower link 50 to cover the cutout portion by screws. Opposite ends of the first hinge shaft supporters 55 are provided with a plurality of washers 59 to supply rotating friction force when rotating with the first middle hinge 60.

The first middle hinge 60 comprises the first hinge shafts 61 rotatably coupled to the lower link 50, and a first auxiliary link supporter 63 to be integrally coupled the middle link 70 and to rotatably support the first auxiliary links 110.

The first hinge shafts 61 are respectively provided in a first side of the middle link 70 and an end of the first auxiliary link supporter 63 to rotatably couple opposite sides of the lower link 50. At least one of the pair of the first hinge shafts 61 is provided with a first hinge shaft penetrating part 77 to be penetrated by the cable 15 which connects the monitor main body 10 and the base 20. According to the present embodiment, the first hinge shaft penetrating part 77 is provided in the first hinge shaft 61 provided in the first side of the middle link 70. The cable 15 passing through the first hinge shaft penetrating part 77 is extended to the end of the lower link 50.

The first auxiliary link supporter 63 is provided with the pair of first auxiliary link coupling parts 43 to accommodate an upper side of the first supporting fastening parts 111 provided in both sides of the pair of the first auxiliary links 110 and to be rotatably coupled by the first auxiliary link coupling pins 45. The first auxiliary link coupling pins 45 are coupled with the first auxiliary link coupling parts 43 to be eccentrically placed the first auxiliary links 110 with respect to a rotating axis of the first hinge shafts 61. The first hinge shaft 61 provided in the end of the first auxiliary link supporter 63 has a non-circle shape, and is inserted into and integrally coupled to a first hinge shaft coupling part 73 of the middle link 70.

The second middle hinge 65 is spaced from the first middle hinge 60 so that the upper link 80 is folded in parallel onto the lower link 50. The second middle hinge 65 comprises a pair of second hinge shafts 66 rotatably coupled to the upper link 80, and a second auxiliary link supporter 67 to be integrally coupled the middle link 70 and to rotatably support the second auxiliary links 120.

A rotating axis of the second middle shafts 66 is spaced from the rotating axis of the first hinge shafts 61 in parallel. The second hinge shafts 66 are respectively provided in a first side of the middle link 70 and an end of the second auxiliary link supporter 67 to rotatably couple opposite sides of the upper link 80. At least one of the pair of the second hinge shafts 66 is provided with a second hinge shaft penetrating part 78 to be penetrated by the cable 15 which connects the monitor main body 10 and the base 20. According to the present embodiment, the second hinge shaft penetrating part 78 is provided in the second hinge shaft 66 provided in a first side of the middle link 70. The second hinge shaft penetrating part 78 is connected with the first hinge shaft penetrating part 77 inside the middle link 70. Therefore, the cable 15 inserted into the second hinge shaft penetrating part 78 is extended outside the middle link 70 through the first hinge shaft penetrating part 77.

The second auxiliary link supporter 67 is provided with a pair of second auxiliary link coupling parts 68 to accommodate a lower side of the second supporting fasteners 121 provided in both sides of the pair of the second auxiliary links 120 and to be rotatably coupled by second auxiliary link coupling pins 69. The second auxiliary link coupling pins 69 are coupled with the second auxiliary link coupling parts 68 to be eccentrically placed the second auxiliary links 120 about the rotating axis of the second hinge shafts 66. The second hinge shaft 66 provided in the end of the second auxiliary link supporter 67 has a non-circle shape, and is inserted and integrally coupled to a second hinge shaft coupling part 75 of the middle link 70.

The middle link 70 has a block shape and includes the first side thereof provided with one of the first hinge shafts 61 and one of the second hinge shafts 66, and the second side thereof provided with the first hinge shaft coupling part 73 and the second hinge shaft coupling part 75 respectively coupling the other one of the first hinge shafts 61 and the other one of the second hinge shafts 66 which are provided in the ends of the first auxiliary ink supporter 63 and the second auxiliary link supporter 67, respectively, not to rotate with respect to each other. The middle link 70 is provided with the second hinge shaft penetrating part 78 depressed to insert the cable 15, which passes through a monitor shaft penetrating part 98 and is extended to a lateral portion of the upper link 80, in an axis direction of the second hinge shaft 66, and the first hinge shaft penetrating part 77 depressed to be connected with the second hinge shaft penetrating part 78 so that the cable 15 passes from the second hinge shaft penetrating part 78 in an axis direction of the first hinge shaft 61, and is extended to a lateral portion of the lower link 50. Therefore, the cable 15 connected with the monitor main body 10 is extended to an end of the upper link 80 through the monitor shaft penetrating part 98 of the monitor hinge 90, extended to an end of the lower link 50 through the second hinge shaft penetrating part 78 and the first hinge shaft penetrating part 77 which are provided in the middle link 70, and extended to the base 20 through the base shaft penetrating part 38 of the base hinge 30. Therefore, if the cover (not shown) is attached to the upper link 80 and the lower link 50, it prevents the cable 15 from being exposed to an outside of the lower and upper links 50 and 80.

The upper link 80 is a rectangle plate and includes a lower side tiltably coupled to the second middle hinge 65 and an upper side tiltably coupled to the monitor hinge 90. The upper link 80 comprises a pair of second hinge shaft supporters 81 provided in lower both sides of the upper link 80 to accommodate and rotatably couple the second hinge shafts 66, and a pair of monitor shaft supporters 85 provided in upper both sides of the upper link 80, and to accommodate and rotatably couple a pair of monitor hinge shafts 97 of the monitor hinge 90.

At least one of the pair of the second hinge shaft supporters 81 includes a cutout portion formed on an end thereof to easily accommodate the second hinge shaft 66, and another second hinge shaft supporter 83 to be coupled to the upper link 80 to cover the cutout portion by a screw. Both sides of the second hinge shaft supporters 81 are provided with a plurality of washers 59 to supply the rotating friction force when rotating with the second middle hinge 65.

At least one of the pair of the monitor shaft supporters 85 includes a cutout portion formed on an end thereof to easily accommodate the monitor hinge shaft 97, and a monitor shaft supporter 87 is coupled to the upper link 80 to cover the cutout portion by a screw.

The monitor hinge 90 supports the monitor main body 10 against the upper link 80 to tilt the monitor main body 10 about the horizontal direction axis with respect to the upper link 80. The monitor hinge 90 comprises a monitor bracket 91 coupled to the monitor main body 10, and the monitor hinge shafts 97 coupled to the monitor bracket 91 and the upper link 80 to rotate at least one of the monitor bracket 91 and the upper link 80. The monitor hinge 90 further comprises a monitor auxiliary link supporter 99 coupled to the monitor bracket 91 to rotatably support the second auxiliary links 120, and a tilting coil spring 105 provided between the monitor auxiliary link supporter 99 and the monitor bracket 91 to apply pressure to the monitor bracket 91 in a forward tilting direction.

The monitor bracket 91 further comprises a monitor shaft coupling part 93 to accommodate a tilting shaft 103 coupled to an end of the monitor auxiliary link supporter 99, and a friction spring member 101 inserted into the monitor shaft coupling part 93 to be pressed at a circumference surface of the tilting shaft 103. The monitor bracket 91 is provided with a pivoting bracket fastener 95 fastened a pivoting bracket 131 (FIGS. 4 and 5) of the pivoting unit 130 by a screw.

The monitor hinge shafts 97 are respectively provided in a first side of the monitor bracket 91 and an end of the monitor auxiliary link supporter 99 to rotatably couple opposite sides of the upper link 80. At least one of the pair of the monitor hinge shafts 97 is provided with the monitor shaft penetrating part 98 to be penetrated by the cable 15 connecting the monitor main body 10 and the base 20. According to the present embodiment, the monitor shaft penetrating part 98 is provided in the monitor hinge shaft 97 provided in the first side of the monitor bracket 91. The cable 15 passing through the monitor shaft penetrating part 98 is extended to a lateral portion of the upper link 80.

The first auxiliary links 110 connect the first middle hinge 60 and the base hinge 30 to transmit a rotating force of the lower link 50 with respect to the base 20 to the middle link 70 to move or rotate the middle link 70 with respect to the lower link 50. The first auxiliary links 110 are coupled to the base hinge 30 and the first middle hinge 60 eccentrically with respect to rotating of the lower link 50. The first auxiliary links 110 have a bar shape as a pair, and are provided in parallel with the lower link 50 in a lateral portion of the lower link 50 and are integrally rotated the lower link 50 with respect to the base 20. Both sides of the first auxiliary links 110 are provided with the first supporting fastening parts 111 to be rotatably coupled to the first auxiliary coupling parts 43 by the first auxiliary link coupling pins 45. Between the pair of the first auxiliary links 110 are provided with a first spring member 115 having opposite sides respectively coupled to corresponding portions of the pair of the first auxiliary links 110 so that the lower link 50 is pressurized (or biased) to the base 20 in the forward tilting direction. Alternatively, the opposite sides of the first spring members 115 may be respectively coupled to alternatively corresponding portions of the pair of the first auxiliary links 110 so that the lower link 50 is pressurized (or biased) to the base 20 in a backward tilting direction.

The first spring member 115 is coupled to first spring fasteners 113 provided in the pair of the first auxiliary links 110, and has a coil spring shape to pull the first auxiliary links 110 in a reverse direction each other.

The second auxiliary links 120 connect the second middle hinge 65 and the monitor hinge 90 to transmit a tilting force of the upper link 80 with respect to the middle link 70 to the monitor main body 10 to move or rotate the monitor main body 10 with respect to the upper link 80. The second auxiliary links 120 are coupled to the monitor hinge 90 and the second middle hinge 65 eccentrically with respect to rotating of the upper link 80. The second auxiliary links 120 have a bar shape as a pair, and are provided in the lateral portion of the upper link 80 in parallel with the upper link 80 and integrally rotated with the upper link 80 with respect to the lower link 50. Opposite ends of the second auxiliary links 120 are provided with the second supporting fasteners 121 to be rotatably coupled to the second auxiliary link coupling parts 68 by the second auxiliary link coupling pins 69. Between the pair of the second auxiliary links 120 are provided with a second spring member 125 respectively coupled to corresponding portions of the second auxiliary links 120 to pressurize the monitor main body 10 in the forward tilting direction with respect to the upper link 80. Alternatively, opposite sides of the second spring member 125 are respectively coupled to alternatively corresponding portions of the pair of the second auxiliary links 120 to pressurize the monitor main body 10 in the backward tilting direction with respect to the upper link 80.

The second spring member 125 has a coil spring shape to be coupled to second spring fasteners 123 provided in the pair of the second auxiliary links 120 to pull the second auxiliary links 120 in the reverse direction each other.

With this configuration, a tilting process of the monitor main body 10 of the monitor apparatus according to the embodiment of the invention will be described with reference to the FIGS. 7 through 10 as follows.

Figure 7:
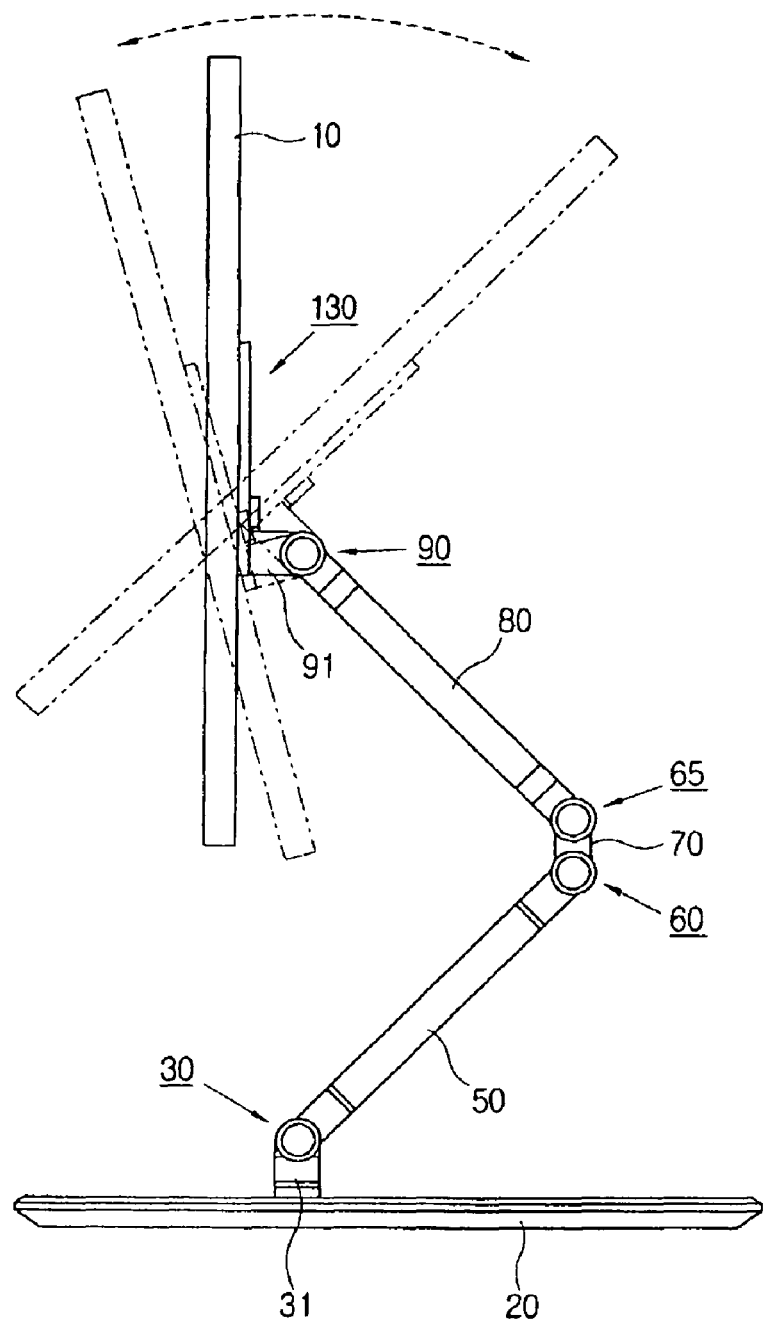
FIG. 7 is a side view illustrating a tilting operation of the monitor main body with respect to an upper link of the monitor apparatus of FIG. 1.

Referring to FIG. 7, the monitor bracket 91 of the monitor main body 10 tilts about the tilting shaft 103 of the monitor hinge 90 in the front and rear direction. At this case, the tilting shaft 103 is pressingly inserted in the monitor shaft coupling part 93 of the monitor bracket 91 and the friction spring member 101. Thus, if the monitor bracket 91 rotates with the respect to the tilting shaft 103, a user may be required to use a predetermined force.

Figure 8:
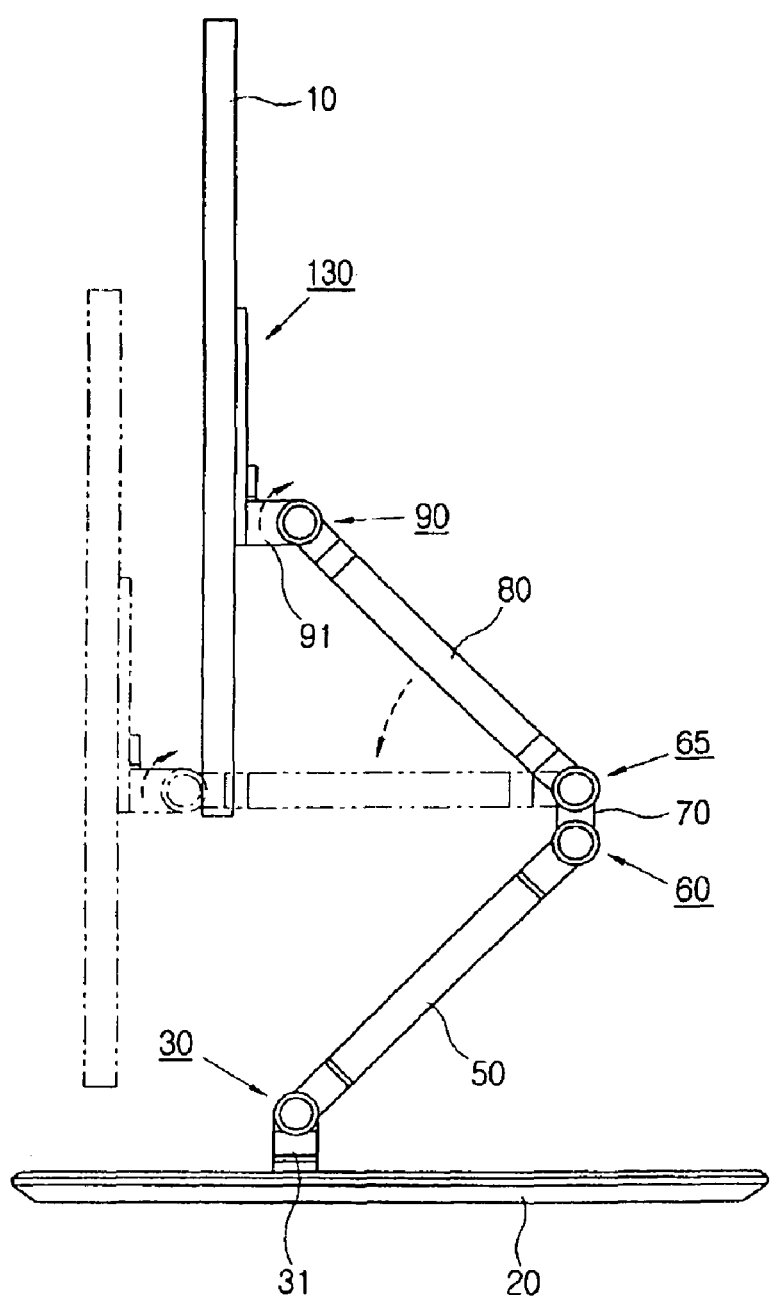
FIG. 8 is a side view illustrating a tilting operation of the upper link with respect to a lower link of the monitor apparatus of FIG. 1.

Referring to FIG. 8, the upper link 80 may tilt about the second hinge shaft 66 of the second middle hinge 65 in the front and rear direction. At this case, between the upper link 80 and the second middle hinge 65 are provided with the washers 59 to supply the rotating friction force. When the upper link 80 rotates about the second hinge shaft 66, the second auxiliary links 120 are rotated with the upper link 80 together. According to the rotating of the second auxiliary links 120 (FIG. 3), the monitor auxiliary link supporter 99 is rotated. The monitor auxiliary link supporter 99 rotates the monitor bracket 91 by the tilting shaft 103 inserted in the monitor bracket 91, thereby rotating the monitor main body 10 with respect to the upper link 80. Therefore, when the upper link 80 tilts about the second middle hinge 65, the monitor main body 10 is tilted with respect to the upper link 80 by the second auxiliary links 120, so that a viewing angle of the monitor main body 10 is maintained, a height of the monitor main body 10 with respect to the base 20 is adjusted. That is, an angle between a plane of the monitor main body 10 and a plane of the base 20 is maintained while the height is adjusted by moving the upper link 80 with respect to the lower link 50.

Figure 9:
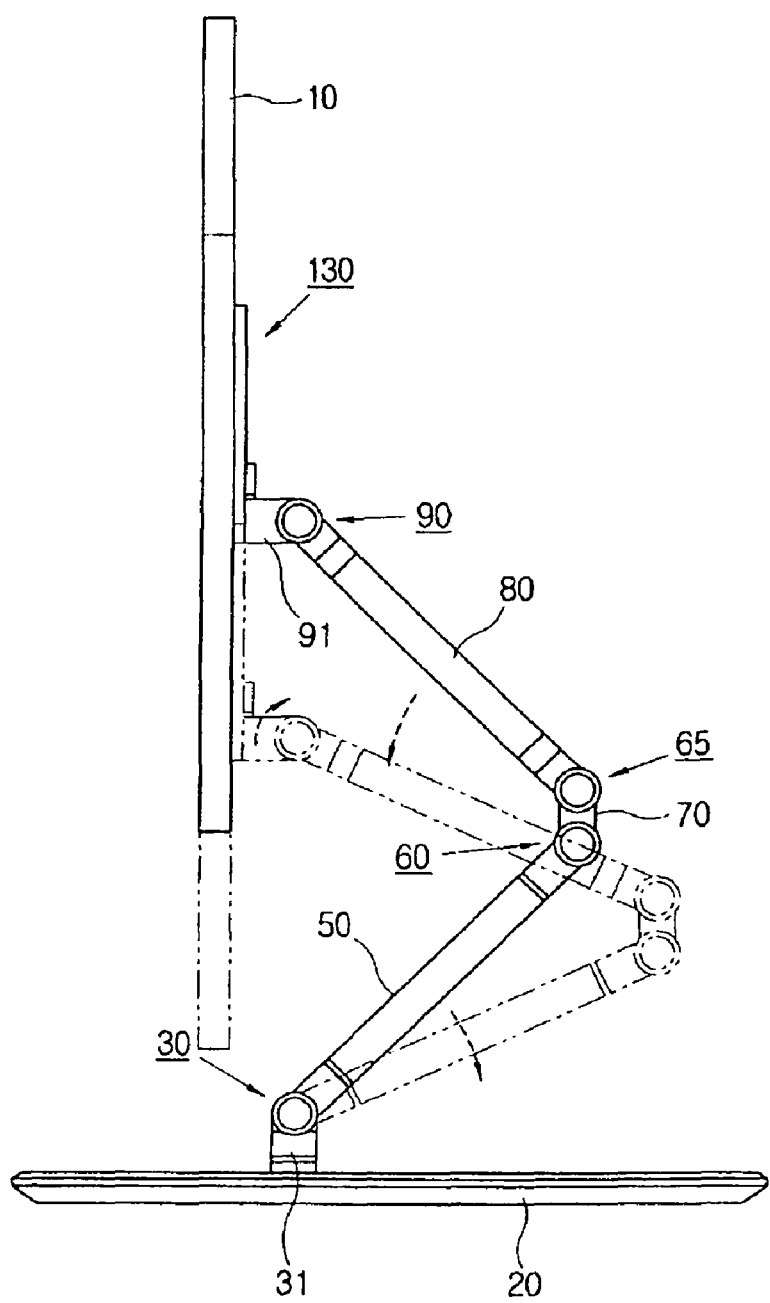
FIG. 9 is a side view illustrating a tilting operation of the lower link with respect to a base of the monitor apparatus of FIG. 1.

Referring to FIG. 9, the lower link 50 may tilt about the base hinge shafts 37 of the base hinge 30 in the front and rear direction. At this case, between the lower link 50 and the first middle hinge 60 are provided with the washers 59 to supply the rotating friction force. When the lower link 50 rotates about the base hinge shafts 37, the first auxiliary links 110 are integrally rotated with the lower link 50. The rotating of the first auxiliary links 110 rotates the first hinge shaft 61 of the first middle hinge 60. The rotating of the first hinge shaft 61 rotates the middle link 70, and the rotating of the middle link 70 rotates the second hinge shaft 66. The rotating of the second hinge shaft 66 rotates the second auxiliary link supporter 67, thereby rotating the second auxiliary links 120. The rotating of the second auxiliary links 120 integrally rotates the upper link 80. At this moment, referring to FIG. 9, the first auxiliary links 110 may tilt the upper link 80 in the reverse direction against the tilting of the lower link 50. The rotating of the upper link 80 may rotate the monitor main body 10 as described to FIG. 8. Therefore, when the lower link 50 tilts about the base hinge 30, the monitor main body 10 is tilted with respect to the upper link 80 by the first auxiliary links 110 and the second auxiliary links 120, so that a viewing angle of the monitor main body 10 is maintained, a height of the monitor main body 10 is adjusted further broadly. That is, an angle between the plane of the monitor main body 10 and the plane of the base 20 is maintained while the height is adjusted by moving the lower link 80 with respect to the base 20. Also, the monitor main body 10 moves between a first position and a second position within the same plane.

Figure 10:
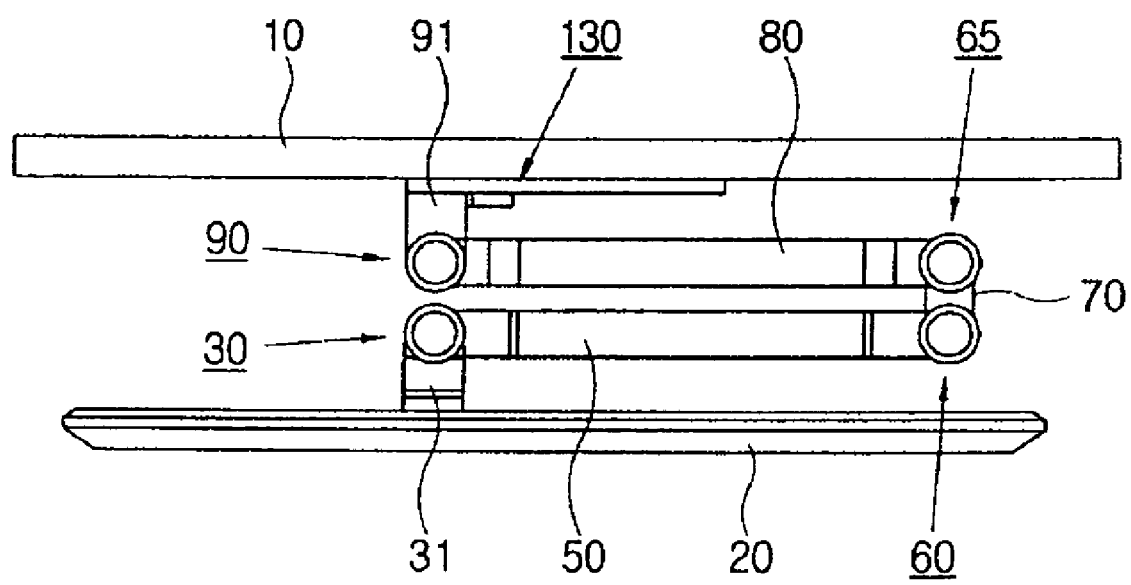
FIG. 10 is a side view illustrating a state in which the base, the lower link, the upper link, and the monitor main body of the monitor apparatus of FIG. 1 are folded to be parallel to each other.

Referring to FIG. 10, the monitor apparatus according to the present embodiment may fold the upper link 80 and the lower link 50 to be parallel to each other by the first middle hinge 60 and the second middle hinge 65 which have different rotating axes. The base 20, the lower link 50, the upper link 80 and the monitor main body 10 are folded to be parallel to each other by the monitor hinge 90, the base hinge 30, the first auxiliary links 110, and the second auxiliary links 120. The monitor apparatus may fold all of the base 20, the lower link 50, the upper link 80 and the monitor main body 10 to be in parallel, thereby reducing a packing size of the monitor apparatus and distribution cost and maximizing a storage and transfer capacity of monitor apparatuses.

Figure 4:
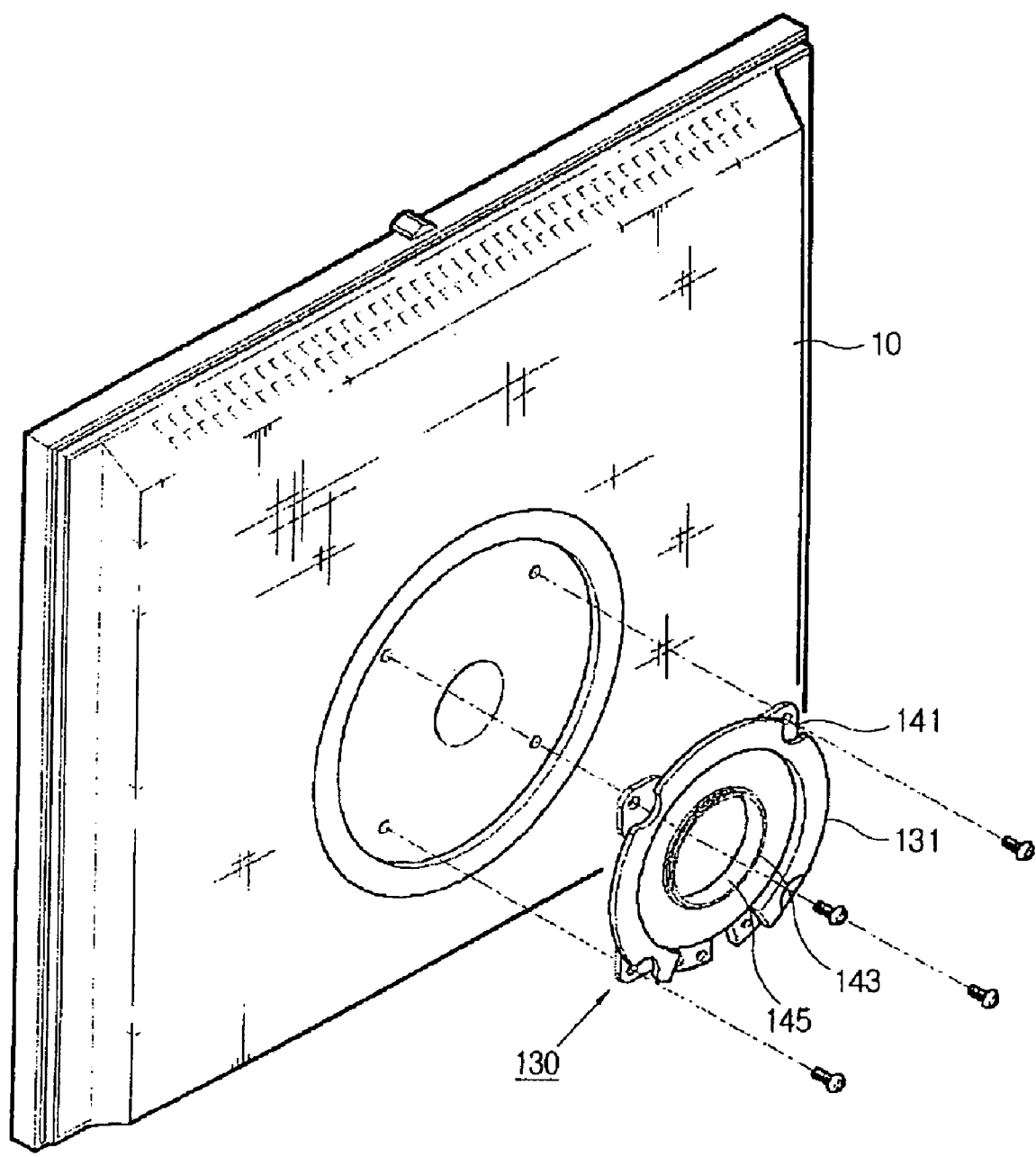
FIGS. 4 and 5 are an exploded perspective view illustrating a pivoting unit of the monitor apparatus of FIG. 1.
Figure 5:
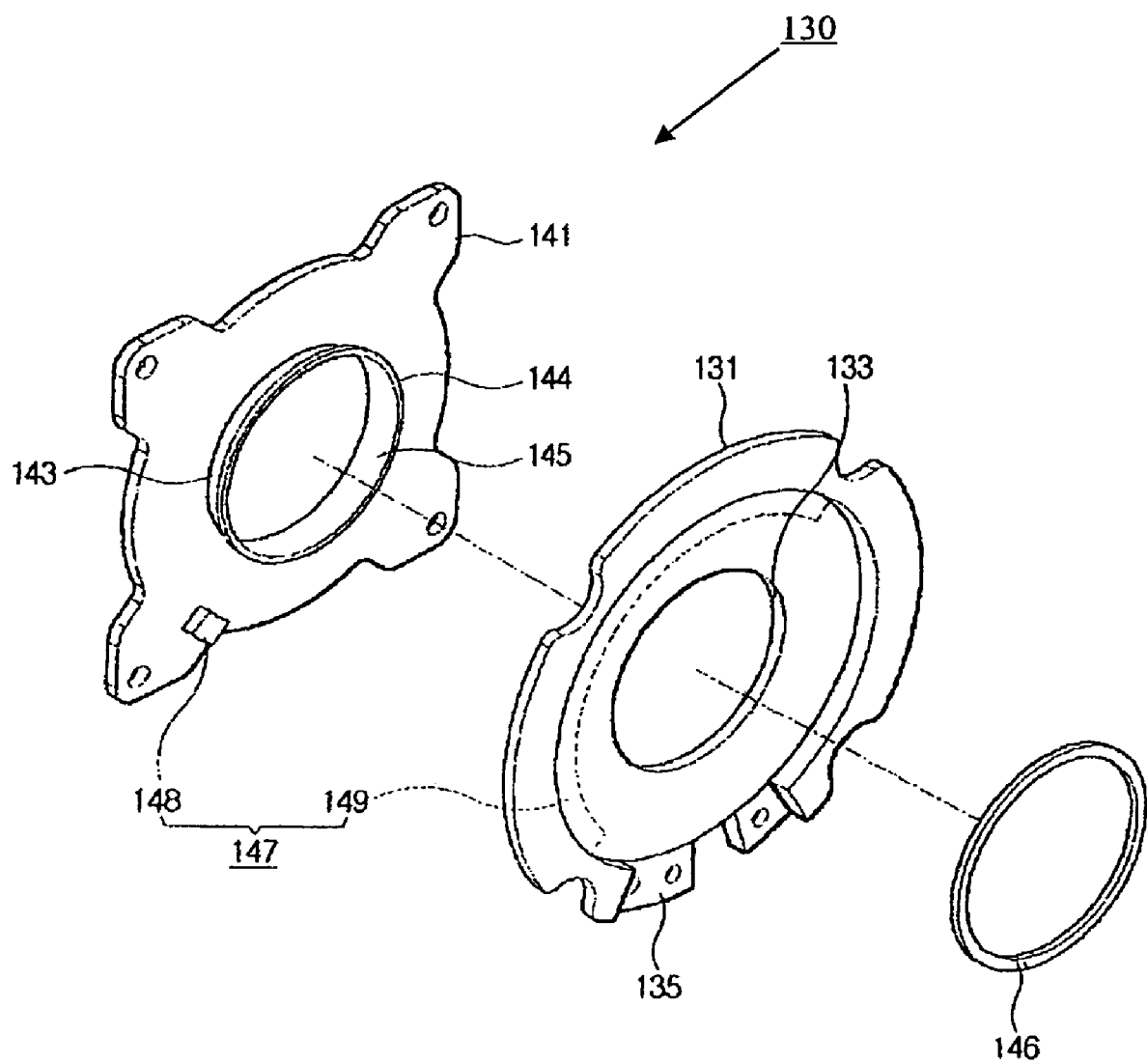

FIGS. 4 and 5 are exploded perspective views illustrating the pivoting unit 130 of the monitor apparatus of FIG. 1. As illustrated in FIGS. 1, 4, and 5, the pivoting unit 130 is provided between the monitor main body 10 and the monitor hinge 90 to support the monitor main body 10 to pivot about the rotating axis of the forward and rear direction with respect to the monitor bracket 91. The pivoting unit 130 comprises the pivoting bracket 131 coupled to the monitor hinge 90, the monitor bracket 91 having a first side pivotably coupled to the pivoting bracket 131 and a second side coupled to the monitor main body 10, a pivoting shaft 143 projected and coupled from one of the pivoting bracket 131 and the monitor bracket 91 to the other one of the pivoting bracket 131 and the monitor bracket 91 to pivot the monitor bracket 91 with respect to the pivoting bracket 131. The pivoting unit 130 further comprises a pivoting angle controller 147 to control the rotating angel of the main body bracket 141 with respect to the pivoting bracket 131.

The main body bracket 141 includes a first side coupled to a rear of the monitor main body 10 by a screw, and a second side provided with the pivoting shaft 143 to be projected backwardly.

The pivoting bracket 131 comprises a pivoting shaft accommodating part 133 to be rotatably coupled with the pivoting shaft 143, and a monitor bracket fastener 135 to be coupled with the pivoting bracket fastener 95 by a screw.

The pivoting shaft 143 comprises a pivoting shaft penetrating part 145 which has a cylinder shape and a penetrated center area through which the cable 15 connected with the monitor main body 10 passes. An end part of the pivoting shaft 143 is provided with a bending part 144 which is inserted into the pivoting shaft accommodating part 133 and then bent to pressurize or bias a back edge of the pivoting shaft accommodating part 133. Therefore, the bending part 144 adheres closely between the main body bracket 141 and the pivoting bracket 131, thereby generating a rotating friction force. Between the main body bracket 141 and the pivoting bracket 131 may be provided with a washer 146.

The pivoting angle controller 147 comprises a projection 148 projected from one of the main body bracket 141 and the pivoting bracket 131 to the other one of the main body bracket 141 and the pivoting bracket 131, and a projection guider 149 provided the other one of the main body bracket 141 and the pivoting bracket 131 to rotatably guide the projection 148 in a predetermined range, for example, a range of 180 to 360 degrees.

With this configuration, the operation process of the pivoting unit 130 of the monitor apparatus according to the embodiment of the invention will be described with reference to FIG. 11.

Figure 11:
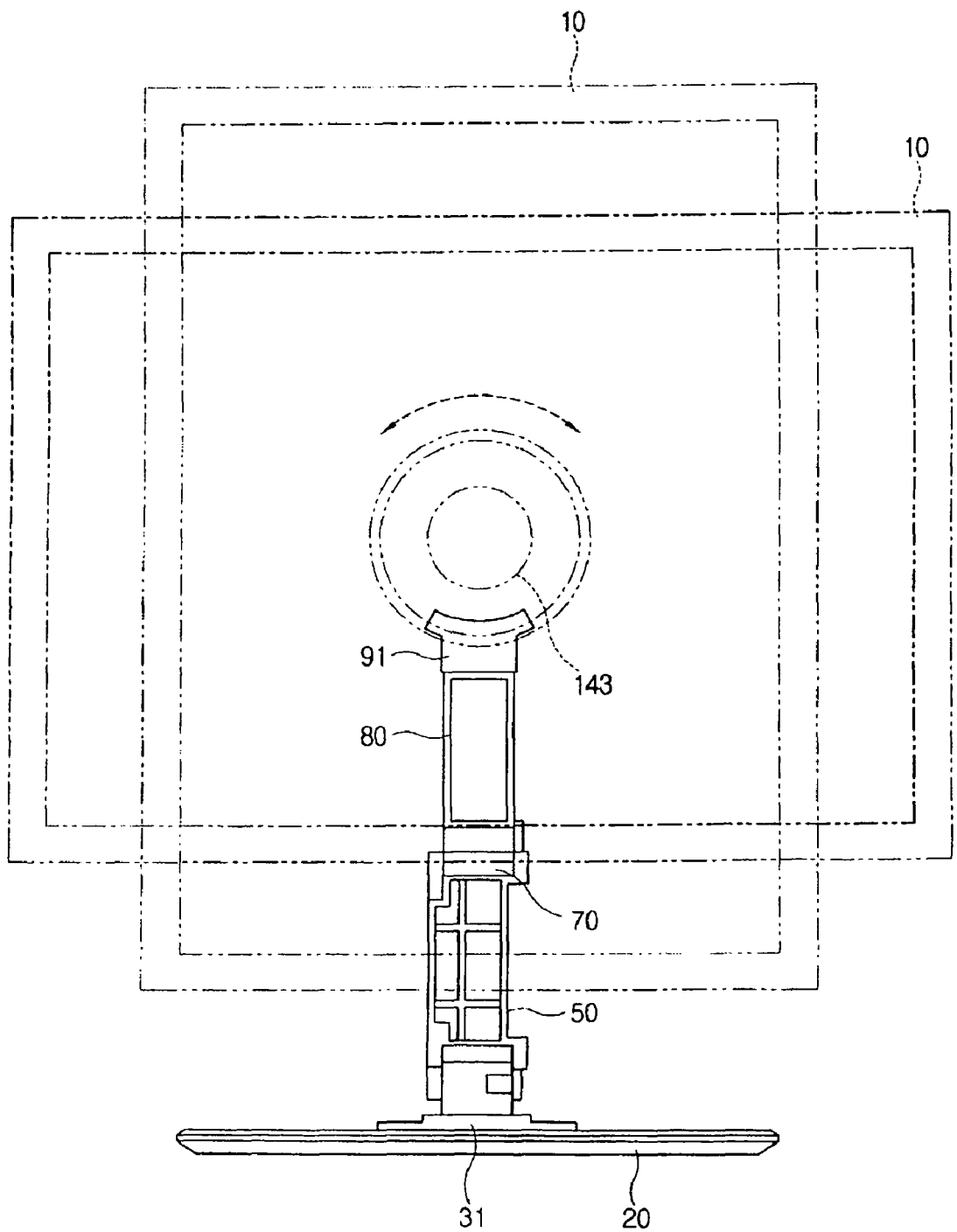
FIG. 11 is a front view illustrating a pivoting operation of the monitor main body with respect to the upper link of the monitor apparatus of FIGS. 1, 4, and 5.

Referring to FIG. 11, if the monitor main body 10 is pivoted about the pivoting shaft 143, the projection 148 can rotate along the projection guider 149. The monitor main body 10 is capable of pivoting up to the range of 180 degrees with respect to the monitor bracket 91 in a case where an angle range of both end sides of the projection guider 83 is about 180 degree. Therefore, the monitor apparatus according to the present embodiment provides the pivoting unit 130 to easily pivot the monitor main body 10.

FIG. 6 is an exploded perspective view of the swivel unit 150 of the monitor apparatus according to the embodiment of the present general inventive concept. As illustrated in FIGS. 1 and 6, the swivel unit 150 is provided between the base 20 and the base hinge 30 and swivels the monitor main body 10 about a vertical direction axis with respect to the base 20. The swivel unit 150 comprises a swivel member 151 coupled to the base hinge 30, and a swivel supporter 155 to fasten and support a middle area of the swivel member 151 and the base 20 to swivel the swivel member 151 with respect to the base 20.

The swivel member 151 comprises a base bracket fastener 152 fastened to the base bracket 31 by a screw to support the base bracket 31, and a swivel supporter fastening part 153 fastened to the swivel supporter 155 by a fastening screw 157 in the middle area to be used as a rotating center of the swivel member 151.

The swivel supporter 155 is depressed in the base 20 to support and accommodate the swivel member 151, and comprises a swivel member fastener 156 to be rotatably fastened to the swivel member 151 by the fastening screw 157.

With this configuration, the operation process of the swivel unit 150 of the monitor apparatus according to the embodiment of the invention will be described with reference to FIG. 12.

Figure 12:
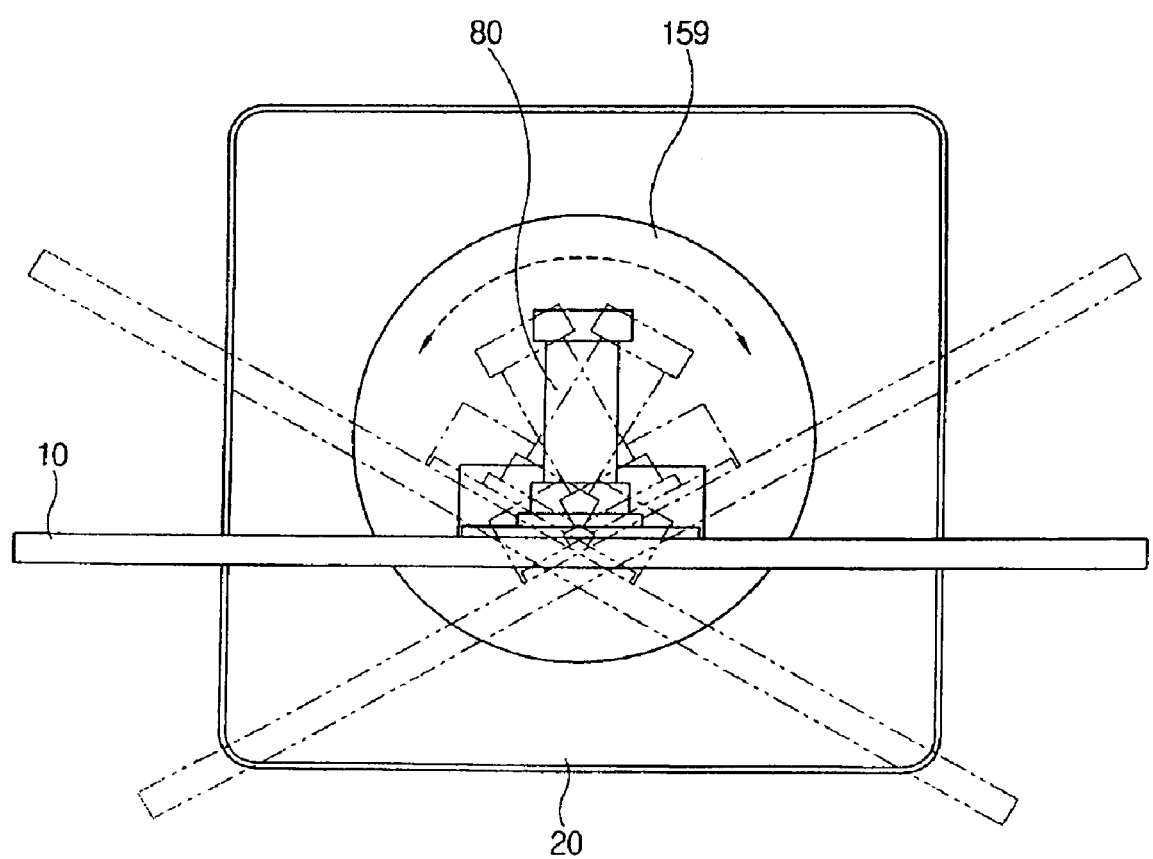
FIG. 12 is a plan view illustrating a swiveling operation of the lower link with respect to the base of the monitor apparatus of FIGS. 1 and 6.

Referring to FIG. 12, if the monitor main body 10 is swiveled about the fastening screw 157 used as the swiveling axis, the monitor main body 10 can swivel with respect to the base 20 in the predetermined angle. The predetermined angle of the swiveling may be in the range of 180 to 360 degrees. Therefore, the monitor apparatus according to the embodiment of the invention provides the swiveling unit 150, thereby usefully swiveling the monitor main body 10.

As described above, in a monitor apparatus having a monitor main body, a base, a plurality of links provided between the monitor main body and the base, and a middle link disposed and respectively coupled between the links, the monitor main body and the base are folded each other to minimize a packing volume. Since the plurality of links comprise a first link rotatably coupled to the base and a second link rotatably coupled to the monitor main body, and the middle link comprises first and second ends rotatably coupled to the first and second links, respectively, the monitor main body, the base, and the first and second links can be folded to be parallel to one another to minimize the packing volume. In addition, since the first link, the middle link, and the second link are connected in series, the monitor apparatus can have a various angle change of the monitor main body and maintain a viewing angle of the monitor main body while adjusting a height of the monitor main body with respect to a base.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A monitor apparatus comprising: a monitor main body; a base; a plurality of links provided between the monitor main body and the base, the plurality of links comprising a lower link tiltably coupled to the base, and an upper link tiltably coupled to the monitor main body; a middle link disposed and respectively coupled between the lower link and the upper link such that the monitor main body and the base are folded over each other; a base hinge coupled between the lower link and the base; a monitor hinge coupled between the upper link and the monitor main body; a pivoting unit to pivot the monitor main body about a landscape and portrait direction with respect to the links; a swivel member coupled to the base; and a swivel supporter to support and fasten a middle area of the swivel member and the base to swivel the swivel member with respect to the base and to accommodate the swivel member, wherein the monitor main body, the base, the pivoting unit, and the lower and the upper links are formed in a flat plate shape, and the monitor main body, the base and the lower and the upper links can be substantially parallel when the monitor main body and the lower and upper links are folded on the base, and wherein the swivel supporter is depressed in the base, and the swivel member is directly coupled to the base hinge which allows to tilt the lower link with respect to the base is accommodated on the swivel supporter.

2. The monitor apparatus according to claim 1, wherein the pivoting unit comprises:
 a pivoting bracket coupled to one of the links; and
 a monitor bracket having a first side thereof pivotably coupled to the pivoting bracket and a second side thereof coupled to the monitor main body.

3. The monitor apparatus according to claim 1, wherein:
 the plurality of links comprises a lower link having tiltably coupled to the base, and an upper link tiltably coupled to the monitor main body; and
 the middle link is disposed between the lower link and the upper link.

4. The monitor apparatus of claim 3, further comprising:
 a base hinge coupled between the lower link and the base; and
 a monitor hinge coupled between the upper link and the monitor main body.

5. The monitor apparatus according to claim 4, wherein:
 the monitor hinge comprises a monitor bracket coupled to the monitor main body and a monitor hinge shaft coupled to the monitor bracket and the upper link to rotate at least one of the monitor bracket and the upper link; and
 the base hinge comprises a base hinge shaft coupled to the base bracket and the lower link to rotate at least one of the base bracket and the lower link.

6. The monitor apparatus according to claim 5, further comprising:
 a cable to connect the monitor main body and the base,
 wherein the base hinge shaft and the monitor hinge shaft comprise a base shaft penetrating part and a monitor shaft penetrating part respectively which have a hollow shape to be penetrated by the cable, and the middle link comprises a second hinge shaft penetrating part depressed so that the cable, which passes through the monitor shaft penetrating part and is extended to a lateral portion of the upper link, is inserted in an axis direction of the monitor hinge shaft, and a first hinge shaft penetrating part depressed to connect the second hinge shaft penetrating part so that the cable passes from the second hinge shaft penetrating part in an axis direction of the base hinge shaft and is extended to a lateral portion of the lower link.

7. The monitor apparatus according to claim 3, wherein the middle link comprises;
   a first middle hinge coupled to a first side of the middle link to tiltably move with respect to the lower link; and
   a second middle hinge coupled to a second side of the middle link to tiltably move with respect to the upper link such that the upper link and the lower link are folded to be parallel to each other.

8. The monitor apparatus of claim 7, wherein the first and second middle hinges comprise a first hinge shaft and a second hinge shaft rotatably coupled to the lower link and the upper link, respectively.

9. The monitor apparatus of claim 8, wherein the middle link comprises a first shaft coupling part and a second shaft coupling part respectively coupled to the first hinge shaft and the second hinge shaft such that the first shaft and the second shaft do not rotate with respect to each other.

10. The monitor apparatus according to claim 7, further comprising:
    a first auxiliary link to connect the first middle hinge and the base hinge to transmit a tilting force of the lower link with respect to the base to the middle link to tilt the middle link with respect to the lower link.

11. The monitor apparatus according to claim 10, further comprising:
    a first spring member,
    wherein the first auxiliary link comprised a pair of first auxiliary links, and both sides of the first spring member are respectively coupled to corresponding portion of the pair of the first auxiliary links to press in the lower link in a tiling direction of one of forward and backward directions with respect to the base.

12. The monitor apparatus according to claim 7, further comprising:
    a second auxiliary link to connect the second middle hinge and the monitor hinge to transmit a second tilting force of the upper link with respect to the middle link to the monitor main body to tilt the monitor main body with respect to the upper link.

13. The monitor apparatus according to claim 12, wherein further comprising:
    a second spring member,
    wherein the second auxiliary link comprises a pair of second auxiliary links, and both sides of the second spring member are respectively coupled to the pair of the second auxiliary links to press in the upper link in a second tilting direction of one of second forward and backward directions with respect to the lower link.

14. A monitor apparatus comprising: a monitor main body; a base; a base hinge coupled to the base; a lower link having an end coupled to the base hinge to tilt with respect to the base; a monitor hinge coupled to the monitor main body; an upper link having an end coupled to the monitor hinge to tilt with respect to the monitor main body; a middle link disposed between the lower link and the upper link; a first middle hinge coupled to a first side of the middle link to tiltably move with respect to the lower link; a pivoting unit coupled between the monitor hinge and the monitor main body to pivot the monitor main body with respect to the links; a second middle hinge coupled to a second side of the middle link to tiltably move with respect to the upper link such that an angle between a plane of the monitor main body and a plane of the base is maintained when the monitor main body rotates with respect to the upper link, the angle is maintained when the upper link rotates with respect to the lower link, and the angle is maintained when the lower link rotates with respect to the base; a swivel member coupled to the base; and a swivel supporter to support and fasten a middle area of the swivel member and the base to swivel the swivel member with respect to the base and to accommodate the swivel member, wherein the monitor main body, the base, the pivoting unit, and the lower and the upper links are formed in a flat plate shape, and the monitor main body, the base and the lower and the upper links can be substantially parallel when the monitor main body and the lower and upper links are folded on the base, and wherein the swivel supporter is depressed in the base, and the swivel member is directly coupled to the base hinge which allows to tilt the lower link with respect to the base is accommodated on the swivel supporter.

15. The monitor apparatus according to claim 14, wherein the middle link transmits a rotating force of the lower link to the upper link through the first middle hinge and the second middle hinge and to the monitor main body through the monitor hinge and the upper link such that the upper link is rotated with respect to the lower link and the monitor main body is rotated about the monitor hinge with respect to the upper link when the lower link rotates with respect to the base about the base hinge.

16. The monitor apparatus according to claim 14, wherein the monitor main body moves between a first position and a second position within the same plane when the lower link rotates with respect to the base.

17. The monitor apparatus according to claim 14, wherein the monitor main body, the lower link, and the upper link rotate about the monitor hinge, the base hinge, and the middle link, respectively, to be parallel to the base.

18. The monitor apparatus according to claim 14, wherein rotating axes of the first middle hinge and the second middle hinge are disposed on a plane of the middle link, and the plane of the middle link forms an angle with the plane of the base such that the angle is not changed when the upper link and the lower link rotate with respect to the base.

19. The monitor apparatus according to claim 18, wherein the rotating axes of the first middle hinge and the second middle hinge are spaced-apart from each other.

20. A monitor apparatus comprising: a monitor main body; a base; a base hinge coupled to the base; a lower link having an end coupled to the base hinge to tilt with respect to the base; a monitor hinge coupled to the monitor main body; an upper link having an end coupled to the monitor hinge to tilt with respect to the monitor main body; a middle link disposed between the lower link and the upper link; a pivoting unit coupled between the monitor hinge and the monitor main body to pivot the monitor main body with respect to the upper link; a first middle hinge coupled to a first side of the middle link; a second middle hinge coupled to a second side of the middle link; a pair of first auxiliary links coupled between the base hinge and the first middle hinge; a pair of second auxiliary links coupled between the second middle hinge and the monitor hinge; a swivel member coupled to the base; and a swivel supporter to support and fasten a middle area of the swivel member and the base to swivel the swivel member with respect to the base and to accommodate the swivel member, wherein the monitor main body, the base, the pivoting unit, and the lower and the upper links are formed in a flat plate shape, and the monitor main body, the base and the lower and the upper links can be substantially parallel when the monitor main body and the lower and upper links are folded on the base, wherein the swivel supporter is depressed in the base, and the swivel member is directly coupled to the base hinge which allows to tilt the lower link with respect to the base is accommodated on the swivel supporter.

21. The monitor apparatus according to claim 20, further comprising: a first resilient member coupled between an upper end of one of the first auxiliary links and a lower end of the other one of the first auxiliary links; and a second resilient member coupled between an upper end of one of the second auxiliary links and a lower end of the other one of the second auxiliary links.

22. The monitor apparatus according to claim 21, wherein a rotating force of the lower link is transmitted to the upper link through the first auxiliary link and the first resilient member, and a rotating force of the upper link is transmitted to the monitor main body through the second auxiliary link and the second resilient member.

23. The monitor apparatus according to claim 20, wherein:
   the middle link is rotatably coupled to the lower link and the upper link;
   the first middle hinge is fixedly coupled to the first side of the middle link; and
   the second middle hinge is fixedly coupled to the second side of the middle link.

24. The monitor apparatus according to claim 23, wherein the first middle hinge and the second middle hinge do not move with respect to each other.

25. The monitor apparatus according to claim 24, wherein the pair of first auxiliary links and the pair of second auxiliary links move with respect to the middle link while the first middle hinge and the second middle hinge do not move with respect to the middle link.

26. A monitor apparatus comprising: a display panel; a rotatable base; a linking assembly unit comprising: an upper linking assembly including a first lower end coupled to a first auxiliary support unit, and including a first upper end coupled to a monitor support unit; a lower linking assembly including a second upper end rotatably coupled to the first lower end of the upper linking assembly via a middle linking assembly to rotate the upper linking assembly and the lower linking assembly, and including a second lower end coupled to a base support unit, the second upper end coupled to a second auxiliary support unit; a first outer auxiliary link having a first outer support fastener coupled to the monitor support unit, and a second outer support fastener coupled to the first auxiliary support unit; a first inner auxiliary link having a first inner support fastener coupled to the monitor support unit at a different location than the first outer support fastener, and a second inner support fastener coupled to the first auxiliary support unit at a different location than the second outer support fastener; a second outer auxiliary link having a first outer fastening part coupled to the second auxiliary support unit, and a second outer fastening part coupled to the base support unit; and a second inner auxiliary link having a first inner fastening part coupled to the second auxiliary support unit at a different location than the first outer fastening part, and a second inner fastening part coupled to the base support unit at a different location than the second outer fastening part; a pivoting unit coupled between the display panel and the first upper end of the upper linking assembly to pivot the display panel; a swivel member coupled to the base; and a swivel supporter to support and fasten a middle area of the swivel member and the base to swivel the swivel member with respect to the base and to accommodate the swivel member, wherein the display panel, the pivoting unit, the rotatable base, and the linking assembly unit are formed in a substantially flat plate shape, and the display panel is substantially parallel to the rotatable base when the display panel is folded onto the rotatable base, wherein the swivel supporter is depressed in the rotatable base, and the swivel member is directly coupled to the base hinge which allows to tilt the lower linking assembly with respect to the base is accommodated on the swivel supporter.

27. The monitor apparatus of claim 26, further comprising: the monitor support unit including a first through-hole and a second through-hole different from the first through-hole; the first auxiliary support unit including a third through-hole and a fourth through-hole different from the third through-hole; the second auxiliary support unit including a fifth through-hole and a sixth through-hole different from the fifth through-hole, and the base support unit including a seventh through-hole and a eighth through-hole different from the seventh through-hole.

28. The monitor apparatus of claim 27, wherein: the first outer support fastener of the first outer auxiliary link is coupled to the first through-hole of the monitor support unit, and the second outer support fastener of the first outer auxiliary link is coupled to the third through-hole of the first auxiliary support unit; the first inner support fastener of the first inner auxiliary link is coupled to the second through-hole of the monitor support unit, and the second inner support fastener of the first inner auxiliary link is coupled to the fourth through-hole of the first auxiliary support unit; the first outer fastening part of the second outer auxiliary link is coupled to the fifth through-hole of the second auxiliary support unit, and the second outer fastening part of the second outer auxiliary link is coupled to the seventh through-hole of the base support unit; and the first inner fastening part of the second inner auxiliary link is coupled to the sixth through-hole of the second auxiliary support unit, and the second inner fastening part of the second inner auxiliary link is coupled to the eighth through-hole of the base support unit.

* * * * *